United States Patent
Fahl

(10) Patent No.: US 8,333,550 B2
(45) Date of Patent: Dec. 18, 2012

(54) TWIN SCROLL EXHAUST GAS TURBOCHARGER

(75) Inventor: Thomas Fahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/102,607

(22) Filed: May 6, 2011

(65) Prior Publication Data

US 2011/0236198 A1 Sep. 29, 2011

Related U.S. Application Data

(63) Continuation of application No. PCT/EP2009/006612, filed on Sep. 11, 2009.

(30) Foreign Application Priority Data

Nov. 7, 2008 (DE) .......................... 10 2008 056 358

(51) Int. Cl.
*F01D 25/24* (2006.01)

(52) U.S. Cl. ........ 415/116; 415/204; 415/205; 415/206; 415/175

(58) Field of Classification Search .................. 415/203, 415/204, 205, 206, 116, 175; 417/407
See application file for complete search history.

(56) References Cited

U.S. PATENT DOCUMENTS

| | | | |
|---|---|---|---|
| 2,384,251 A * | 9/1945 | Hill .............................. | 415/178 |
| 2,861,774 A * | 11/1958 | Buchi ............................. | 415/17 |
| 3,010,697 A * | 11/1961 | Lazo et al. .................... | 415/135 |
| 5,340,286 A * | 8/1994 | Kanigowski .................. | 417/407 |
| 7,089,737 B2 * | 8/2006 | Claus ........................... | 60/605.1 |
| 2005/0144946 A1 | 7/2005 | Claus | |

FOREIGN PATENT DOCUMENTS

| | | |
|---|---|---|
| DE | 42 42 494 C1 | 9/1993 |
| DE | 196 53 057 A1 | 6/1998 |
| EP | 1 536 141 A1 | 6/2005 |
| FR | 2 878 562 A1 | 6/2006 |
| JP | 57-137619 A | 8/1982 |
| JP | 3-151519 A | 6/1991 |
| WO | WO 2007/035972 A2 | 4/2007 |
| WO | WO 2009/012989 A1 | 1/2009 |

OTHER PUBLICATIONS

International Search Report dated Feb. 10, 2011 with English translation (six (6) pages).

* cited by examiner

*Primary Examiner* — Ninh H Nguyen
(74) *Attorney, Agent, or Firm* — Crowell & Moring LLP

(57) ABSTRACT

A twin scroll exhaust gas turbocharger for an internal-combustion engine, includes a turbine housing and a first and a second gas inlet port separated from one another by the turbine housing. The inlet ports lead into a first and a second spiral duct, respectively, which extend radially on the outside around an exhaust gas turbine rotatable about an axis. The gas inlet ports are arranged at least in sections parallel to one another in the turbine housing and radially with respect to the axis of rotation in a mutually spaced manner. The first spiral duct, which connects to the first gas inlet port arranged closer to the axis of rotation, extends up to 180° around the exhaust gas turbine. The second spiral duct, which connects to the second gas inlet port farther away from the axis of rotation, extends up to 180° around the remaining circumference of the exhaust gas turbine. As a result, thermal stress to the turbine housing is significantly reduced.

6 Claims, 1 Drawing Sheet

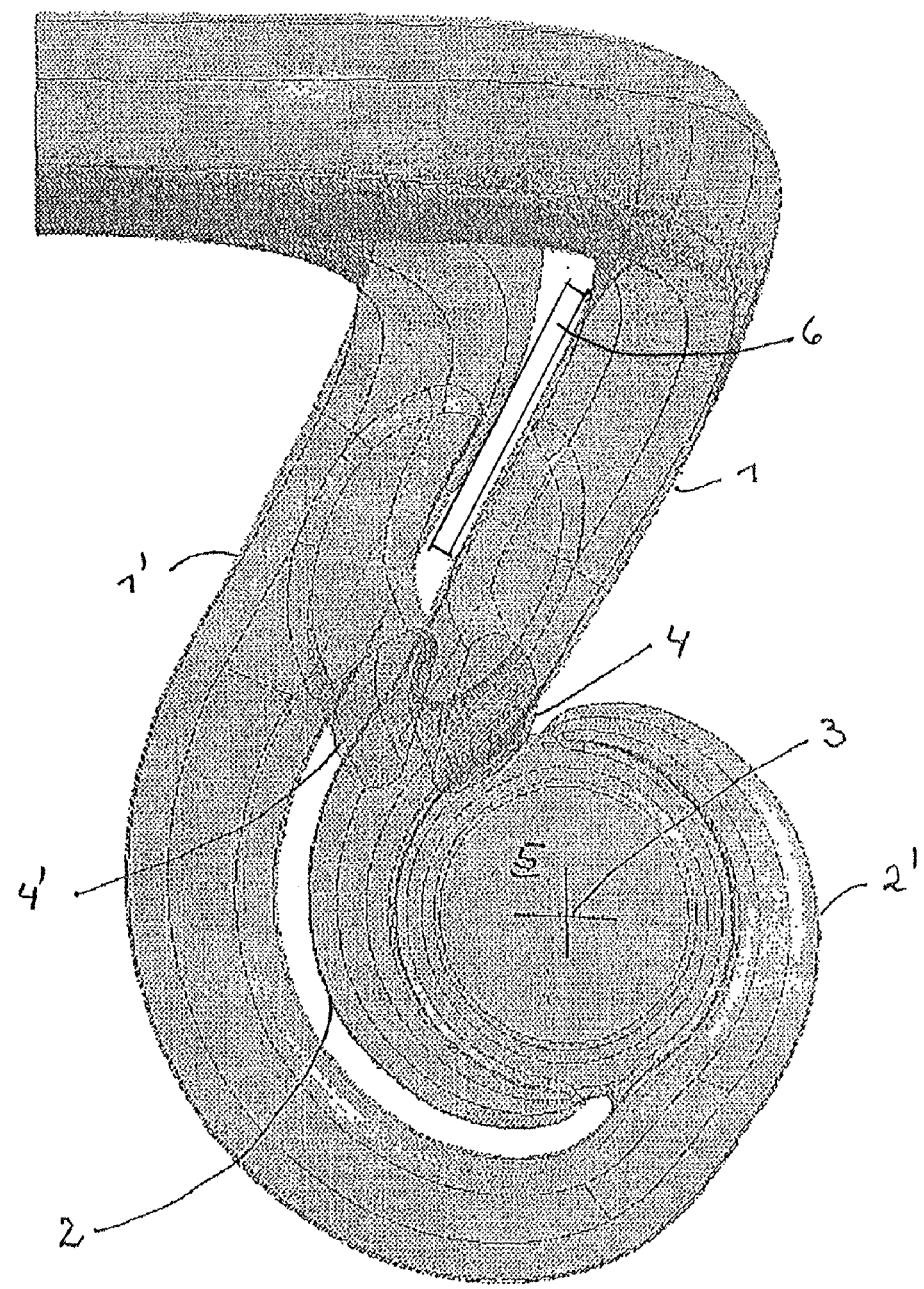

TWIN SCROLL EXHAUST GAS TURBOCHARGER

CROSS-REFERENCE TO RELATED APPLICATIONS

This application is a continuation of PCT International Application No. PCT/EP2009/006612, filed Sep. 11, 2009, which claims priority under 35 U.S.C. §119 from German Patent Application No. DE 10 2008 056 358.7, filed Nov. 7, 2008, the entire disclosures of which are herein expressly incorporated by reference.

BACKGROUND AND SUMMARY OF THE INVENTION

The invention relates to a twin scroll exhaust gas turbocharger.

This invention is based on Japanese Published Patent Application JP-A-3-151519. From JP-A-3-151519, a twin scroll exhaust gas turbocharger for a multi-cylinder internal-combustion engine is known. The twin scroll exhaust gas turbocharger has a turbine housing with a first and a second inlet port separated from one another by the turbine housing. The two inlet ports lead into a first and a second spiral duct, respectively, which extend radially on the outside, largely parallel to one another around a rotatably disposed exhaust gas turbine. Exhaust gas from different cylinders of the internal-combustion engine is admitted to both inlet ports corresponding to the ignition sequence of the internal-combustion engine, whereby a more uniform drive of the exhaust gas turbine takes place. The gas inlet ports and the spiral ducts are arranged such that the exhaust gas is guided to the exhaust gas turbines from opposite sides.

The disadvantage of this known embodiment is a high stress to the turbine housing as a result of the temperature, particularly in the area of the spiral ducts.

It is an object of the present invention to avoid the above-mentioned disadvantage.

This and other objects are achieved by a twin scroll exhaust gas turbocharger for an internal-combustion engine, having a turbine housing and having a first and a second gas inlet port separated from one another by the turbine housing, which inlet ports lead into first and second spiral ducts, respectively. The ducts extend radially on the outside around an exhaust gas turbine of the twin scroll exhaust gas turbocharger. The exhaust gas turbine can be rotated about an axis. The gas inlet ports are arranged at least in sections parallel to one another in the turbine housing and radially with respect to the axis of rotation in a mutually spaced manner. The first spiral duct, which connects to the first gas inlet port arranged closer to the axis of rotation, extends up to 180° around the exhaust gas turbine. The second spiral duct, which connects to the second gas inlet port farther away from the axis of rotation, extends up to 180° around the remaining circumference of the exhaust gas turbine.

As a result of the arrangement of the spiral ducts according to the invention on opposite sides of the exhaust gas turbine without any mutual overlapping of the gas flow regions, an overheating of the turbine housing is avoided, particularly in the area of the spiral ducts.

By means of a further development of the invention, the turbine housing has at least one coolant duct between the gas inlet ports through which a coolant can flow. This advantageously reliably avoids an overheating of the turbine housing in the area of the gas inlet ports. Furthermore, as a result of the further development according to the invention, less heat is radiated into the engine compartment, whereby heat protection measures can be reduced, which results in a further cost reduction.

Since an overheating of the turbine housing is reliably avoided as a result of these further developments, in a further particularly preferred embodiment, the turbine housing can be manufactured of a light-metal material, especially aluminum. As a result of this measure, the weight of the exhaust gas turbocharger is advantageously lowered. Furthermore, the manufacturing costs are advantageously reduced because, as a result of the additional cooling, a less expensive turbine housing material can be used.

Advantageously, the sealing problem is also significantly simplified because an easier thermal linking of the exhaust gas turbocharger to the cylinder head or the crankcase becomes possible if the latter are also manufactured of a light-metal material (same or similar thermal expansion coefficient).

In a further development of the invention, a heating element is arrangeable in the coolant. This development is used for heating the turbine housing after a cold start of the internal-combustion engine, whereby the energy lost during the heating of the catalyst is reduced. For heating the heating element, the recuperated energy from the battery of a mild hybrid can, for example, be used.

Definition of a Mild Hybrid: An electric motor, which replaces the conventional starter and generator, starts, and assists the internal-combustion engine. In addition, the potential of the gasoline engine is increased with respect to driving dynamics (boost effect). Simultaneously, consumption advantages of approximately 15% are achieved. The electric motor and the batteries are not designed for driving in a purely electric operating mode.

The heating element, in a particularly preferred embodiment, may be a positive temperature coefficient (PTC) element.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a modeled top view of gas-bearing ducts for a twin scroll exhaust gas turbocharger according to the invention for an internal-combustion engine.

DETAILED DESCRIPTION OF THE DRAWING

FIG. 1 is a three-dimensional a top view of a wire lattice model of gas-bearing ducts for a twin scroll exhaust gas turbocharger for an internal-combustion engine. A first gas inlet port 1 and a second gas inlet port 1' are illustrated in the wire lattice model, the first gas inlet port 1 transitioning into a first spiral duct 2, and the second gas inlet port 1' transitioning into a second spiral duct 2'. The two spiral ducts 2,2' largely enclose an exhaust gas turbine space 5 in which an exhaust gas turbine can be arranged (not shown). An axis of rotation of the exhaust gas turbine has the reference number 3. The spiral ducts 2, 2' are wrapped around the exhaust gas turbine space 5 radially on the outside, in each case, at an angle of wrap of less than 180°. The spiral ducts 2, 2' are not arranged parallel side-by-side. Furthermore, a first and a second bypass duct 4, 4', respectively, which may also be eliminated in other embodiments, branch off the first and the second gas inlet ports 1,1'.

According to a preferred embodiment, the gas inlet ports 1, 1' are arranged at least in sections parallel to one another in the turbine housing, (not shown), and radially with respect to the axis of rotation 3 in a mutually spaced manner. In this case, the first spiral duct 2, which connects to the first gas inlet port 1 arranged closer to the axis of rotation 3, extends barely 180° around the exhaust gas turbine. The second spiral duct 2', which connects to the second gas inlet port 1' farther away from the axis of rotation 3, extends largely around the remaining circumference of the exhaust gas turbine. A suitable angle of wrap of the spiral ducts 2, 2" around the exhaust gas turbine space 5 amounts to between 90° and 180°, so that there will be no overlapping of the spiral ducts 2, 2'. As a result of this further development, an overheating of the turbine housing is avoided, particularly in the area of the spiral ducts 2, 2'.

In a particularly preferred further development, the turbine housing has at least one coolant duct 6 at least between the gas inlet ports 1, 1', a coolant being able to flow through the coolant duct. The coolant may be either liquid or gaseous. Preferably, a coolant that is inherent to an internal-combustion engine is used as the liquid coolant. A cooling by means of air is also contemplated. As a result of this measure, an overheating of the turbine housing will be reduced again.

Since the above-indicated measures prevent an overheating of the turbine housing, the latter can advantageously be manufactured in a cost-effective manner of a light-metal material, such as aluminum.

In a further particularly preferred embodiment, a heating element, preferably a PTC element (positive temperature coefficient), can be arranged in the coolant duct. This measure is used for heating the turbine housing after a cold start of the internal-combustion engine and therefore leads to a reduction of the energy lost when heating the catalyst. The recuperated energy from the battery of a mild hybrid, as defined above, can be advantageously used for this purpose.

As a result of the further development, a water-cooled twin scroll exhaust gas turbocharger, for example, having a waste gate, can be presented. In addition, the further development results in a reduction of the weight of the exhaust gas turbocharger as well as of the costs, since less expensive materials, such as light-metal materials, can be used for the manufacturing of the turbine housing. Furthermore, a simpler thermal linking of the exhaust gas turbocharger to a light-metal cylinder head or a light-metal crankcase is contemplated because of the identical or similar thermal expansion coefficients. The sealing between a light-metal cylinder head or light-metal crankcase and a light-metal turbine housing is also significantly less critical with respect to thermal distortions and therefore leakages. A further advantage is the reduced entering of heat into the engine compartment, whereby heat protection measures in the engine compartment can be reduced, and whereby cost and weight advantages are also obtained.

TABLE OF REFERENCE NUMBERS

1 First Gas Inlet Port
1' Second Gas Inlet Port
2 First Spiral Duct
2' Second Spiral Duct
3 Axis of Rotation
4 First Bypass Duct
4' Second Bypass Duct
5 Turbine Space The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A twin scroll exhaust gas turbocharger for an internal-combustion engine, comprising:
    a turbine housing;
    first and second gas inlet ports separated from one another by the turbine housing, the first and second gas inlet ports leading, respectively, into first and second spiral ducts that extend radially on an exterior around an exhaust gas turbine of the twin scroll exhaust gas turbocharger, the exhaust gas turbine being rotatable about an axis;
    wherein the first and second gas inlet ports are arranged, at least in sections, parallel to one another in the turbine housing and radially with respect to the axis of rotation in a mutually spaced manner;
    wherein the first spiral duct, which connects to the first gas inlet port arranged closer to the axis of rotation, extends up to 180° around the exhaust gas turbine, and wherein the second spiral duct, which connects to the second gas inlet port arranged further from the axis of rotation, extends up to 180° around a remaining circumference of the exhaust gas turbine, and
    wherein the turbine housing has at least one coolant duct through which a coolant is flowable, the coolant duct being arranged at least between the first and second gas inlet ports.

2. The twin scroll exhaust gas turbocharger according to claim 1, wherein the turbine housing is made of a light-metal material.

3. The twin scroll exhaust gas turbocharger according to claim 2, wherein the light-metal material is aluminum.

4. The twin scroll exhaust gas turbocharger according to claim 3, wherein the heating element is a positive temperature coefficient element.

5. The twin scroll exhaust gas turbocharger according to claim 2, further comprising a heating element arranged in or on the coolant duct.

6. The twin scroll exhaust gas turbocharger according to claim 5, wherein the heating element is a positive temperature coefficient element.

* * * * *